Feb. 26, 1963 G. E. MONROE ETAL 3,079,168
HAND TRUCKS
Filed Sept. 29, 1960 2 Sheets-Sheet 2
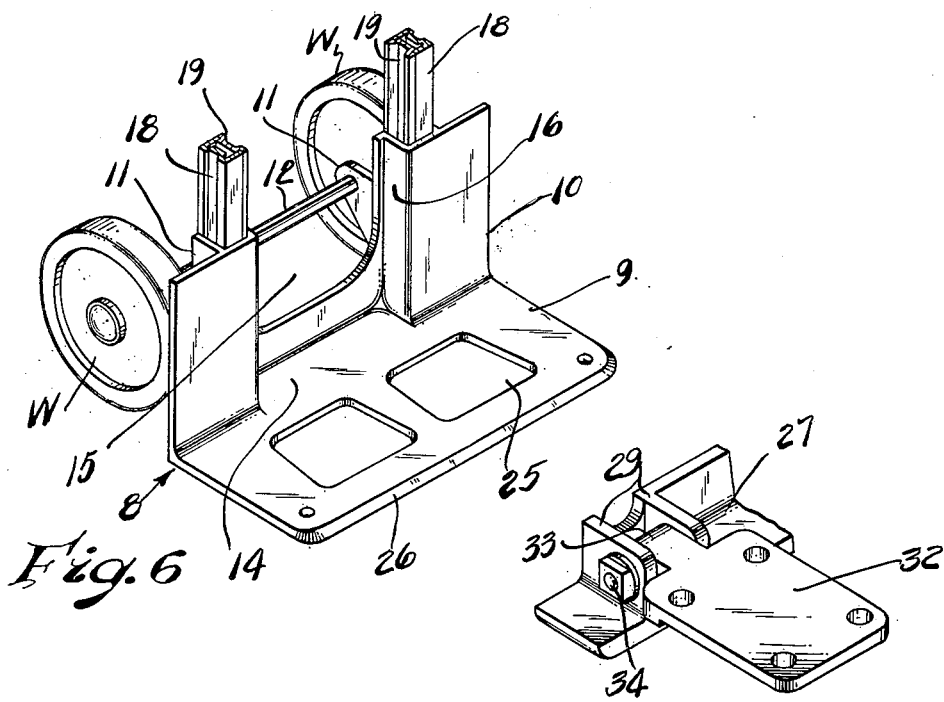
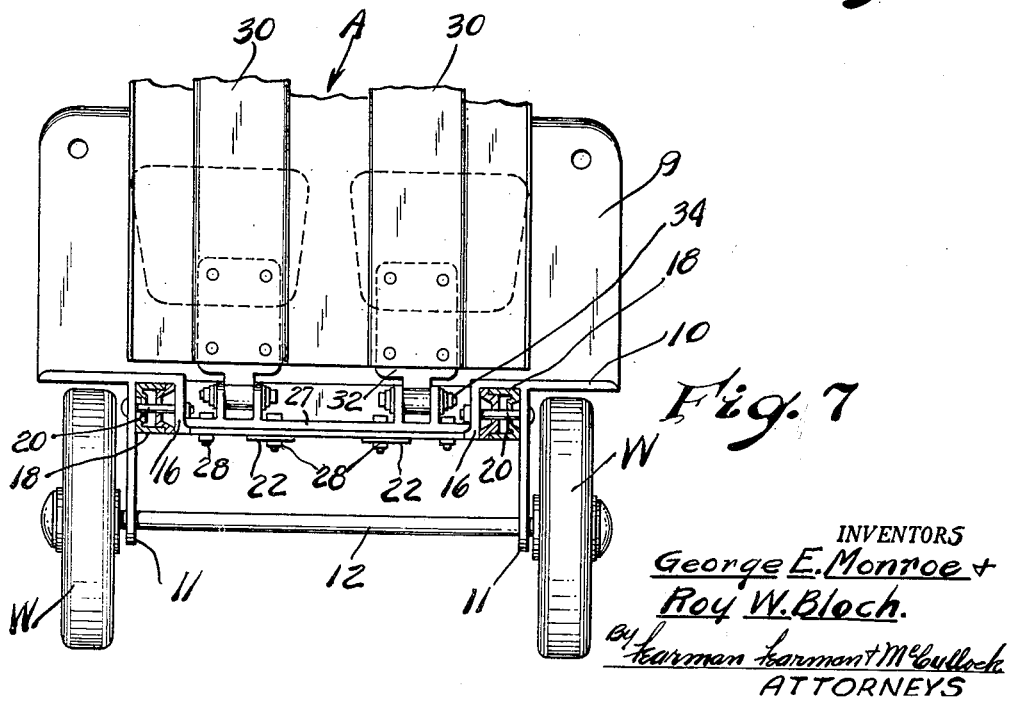
INVENTORS
George E. Monroe +
Roy W. Bloch.
By Fairman Fairman + McCulloch
ATTORNEYS United States Patent Office 3,079,168
Patented Feb. 26, 1963

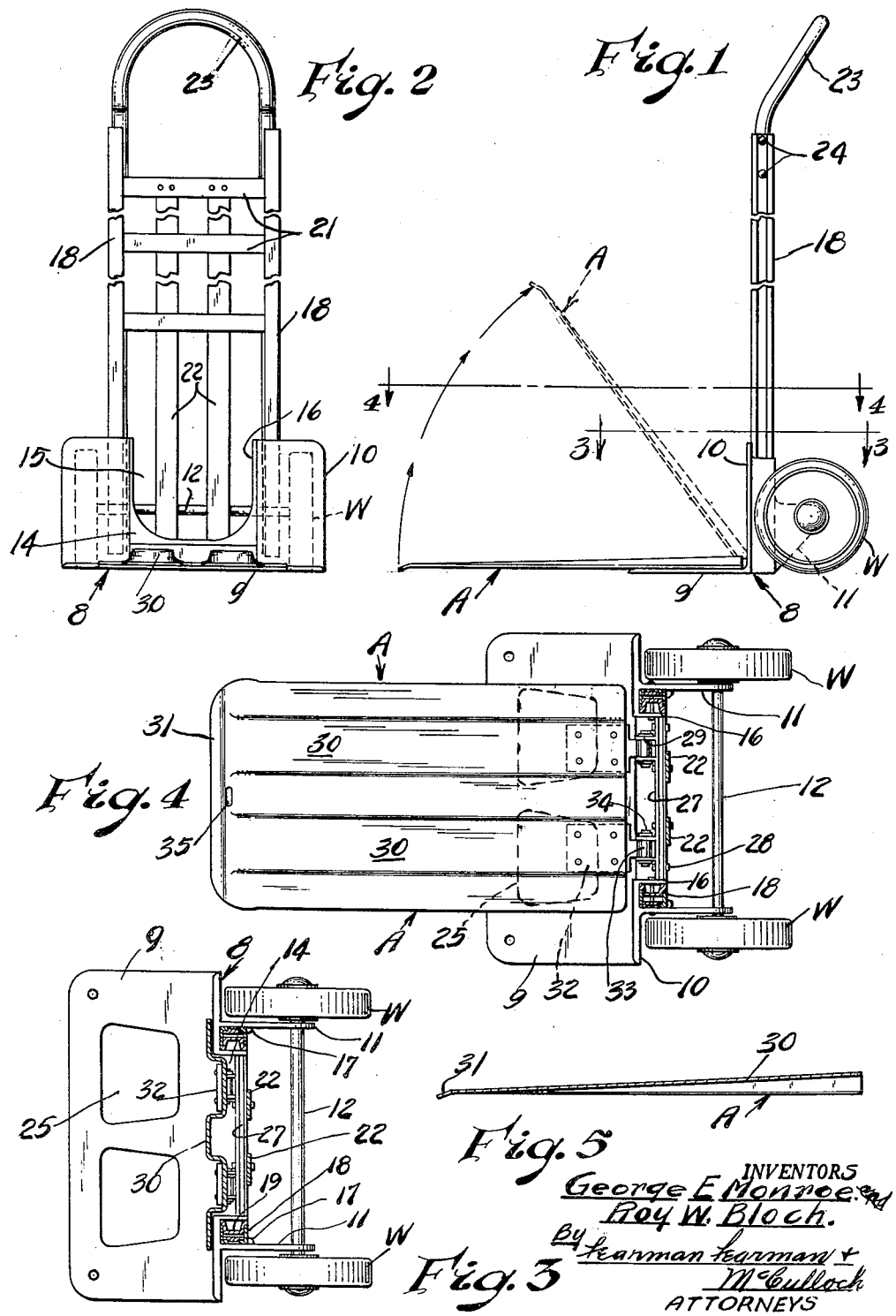

3,079,168
HAND TRUCKS
George E. Monroe, Pinconning, and Roy W. Bloch, Bay City, Mich., assignors to Magline, Inc., Pinconning, Mich., a corporation of Michigan
Filed Sept. 29, 1960, Ser. No. 59,226
4 Claims. (Cl. 280—47.28)

This invention relates to two wheel hand trucks such as used to transport material and articles from one place to another, and more particularly to an adjustable means hingedly-connected to the truck to permit greater bulk loads to be carried and transported than heretofore possible.

One of the prime objects of the invention is to design a very simple, practical and economical hand truck provided with an adjustable, hingedly-connected, extension member, readily swingable from raised to lowered position for increasing the bulk carrying capacity of the truck; which extension, when in raised position, rests in intimate facial contact with the truck frame so that there will be no interference with the normal loading and transporting of various heavy articles or less bulky objects when the truck is utilized in the conventional manner.

Another object of the invention is to design a hingedly-connected swingable extension which when in raised position, nests snugly in and against the truck frame, and which can be formed as a stamping, suitably ribbed to provide rigidity and permit transporting of relatively heavy loads without bending.

A further object is to design a hand truck having a hinged nose extension formed of lightweight material, adapted when in raised position, to form a closure for the open space between the uprights or frame of the truck so that quantities of smaller packages or objects may be carried without falling from the truck when it is tilted for pushing.

Still a further object is to provide a hingedly-connected extension which can be applied to hand trucks presently in use, as well as to trucks in the process of manufacture.

A further object still is to design a hand truck having a cast nose, the configuration of which serves to nest cylinders and round objects therein, so that they can be carried upright, and prevent their rolling off, sidewise, as the dolly is operated.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion and modern details of construction, without departing from the spirit or sacrificing any of the advantages of the invention.

In the drawing:

FIG. 1 is a side elevational view of our new hand truck, the solid lines showing the extension member in lowered position, the broken lines showing the extension being swung to an intermediate raised position.

FIG. 2 is a front elevational view of the truck with the extension in lowered position.

FIG. 3 is a sectional, plan view taken on the line 3—3 of FIG. 1 showing the extension in raised position.

FIG. 4 is a view similar to FIG. 3, taken on the line 4—4 of FIG. 1 with the extension in lowered position.

FIG. 5 is a longitudinal sectional view through the extension member.

FIG. 6 is an enlarged, fragmentary perspective, front elevational view of the truck with the extension member omitted.

FIG. 7 is an enlarged, fragmentary, part sectional, plan view, with the extension in lowered position.

FIG. 8 is a fragmentary, perspective, plan view of the bracket and hinge connection for the extension member.

Hand trucks, sometimes termed dollies, of the general type herein referred to are hand operated and are designed for a wide variety of uses. They must be light in weight, of rigid construction, and it is highly desirable that they be equipped with simple, practical, and inexpensive, easily adjustable means providing, when desired, an enlarged load carrying area, so that considerable bulk, such as travel luggage, boxes and other packages may be carried than is now possible with hand trucks at present in general use, and this we have accomplished by providing an auxiliary extension member, hingedly-connected to and bearing on the load plate of the hand truck; said extension when in load carrying position, providing increased load carrying area, and when swung up in inoperative position nesting tightly against the truck carrying frame, permitting the hand truck to be used in the conventional manner.

Referring now more specifically to the drawings in which is shown the preferred embodiment of our invention, the hand truck proper comprises a nose plate 8 which is preferably but not necessarily in the form of a lightweight metal casting, said nose plate being generally L-shaped in cross section, the load accommodating section 9 being substantially flat, while the vertical section 10 is formed with spaced-apart, rearwardly projecting leg sections 11 suitably bored to accommodate an axle 12, and wheels W are journaled on said axle in the conventional manner. The center portion of the section 10 is recessed as at 14, and is cut away as shown at 15 to eliminate weight, conserve material, and to permit vertical carrying of cylinders or other round objects (not shown), and prevent their rolling off sidewise as the truck is operated.

Ribs 16 are cast integral with the nose plate and form the side walls of the recessed portion 14 of the nose plate, said ribs together with the legs 11 and the lugs 17 provided thereon, forming sockets into which the lower end sections of the side frame channel member 18 are inserted, said channel members projecting upwardly a predetermined distance as shown, and filler members 19 are inserted in the channels 18, at the lower end, bolts 20 serving to secure the channel members, and fillers to the rib and leg sections, thus forming a rigid construction which requires a minimum of transverse bracing and ample clearance for the extension when in raised position. Vertically-spaced, transversely-disposed, tubing members 21 span the channel members 18 for reinforcing purposes, and the spaced-apart upright strips 22 are riveted to the members 21.

A tubular handle member 23 is secured to the upper ends of the side channels 18 by means of bolts 24, said handle being rearwardly inclined to facilitate balancing the load and the hand truck.

The forwardly projecting section 9 of the nose plate is formed with cored openings 25 to eliminate weight, the forward end being beveled as at 26 so that it can be wedged beneath boxes, packages or other objects to be transported.

A transversely-disposed bracket 27 is secured to the upright strips 22 in the recessed portion of the nose plate by means of bolts 28 and spaced-apart pairs of lugs 29 project outwardly from said bracket to which a foldable apron A is secured in a manner to be presently described.

The extension A is preferably formed of lightweight sheet material and is ribbed as at 30 for reinforcing purposes, these ribs gradually tapering in depth from the inner to the outer end as shown, so that the outer free end will be flat, with a slight downward bend as at 31 to compensate for thickness of nose plate section 9 and provide firm bearing on a floor when the extension is in load carrying position. Hinge plates 32 are secured to the lower face of the extension between the ribs 30 and terminate in tubular sections 33 which are positioned between each pair of lugs 29, and bolts 34 serve as hinge pins, and are adjusted to provide friction on the extension member between ribs, causing it to be retained in adjusted position. A slot 35 is provided at the outer end of the extension member to accommodate a strap or cord (not shown) for securing the load in position.

While in the present instance, we have shown the bracket 27 attached to the nose plate member to facilitate attachment of the extension member to trucks already in operation; it will, of course, be understood that the lugs 29 can be cast integral with the nose plate if so desired.

From the foregoing description, it will be obvious that we have perfected a very simple, practical and economical, extension member, swingable to up and down position, which provides for greatly increased carrying capacity, and in which the extension member when in use, rests on the load carrying section 9 of the hand truck, and in raised position nests in intimate contact with the truck frame so that it in no manner interferes with the normal operation or carrying arrangement of the truck.

What we claim is:

1. A wheeled dolly comprising a generally L-shaped one-piece nose plate having a vertical and a horizontally disposed section, spaced apart side frame members connected to said vertical section, transversely spaced pairs of rearwardly projecting members provided on the vertical section to accommodate a side frame member between each pair of said rearwardly projecting members; a recessed area in said vertical section between said side frame members, and an elongated, tapering extension member hingedly connected to the nose plate within said recessed area, said extension member having longitudinally disposed ribs of progressively reduced depth pressed therein, said extension being adapted when in load carrying position, to overlie and bear on the horizontally disposed section of the nose plate, and in raised position to lie in substantially facial contact with the dolly frame members.

2. The combination defined in claim 1 in which said elongated extension is formed of lightweight pressed plate, said ribs running out at a point directly adjacent the free end of said plate, and hinge members accommodated between the side walls of said ribs on the lower face of the plate for pivotal connection to the nose plate within said recessed area.

3. A wheeled dolly comprising an L-shaped nose plate having horizontal and vertical sections, a recessed, rearwardly extending area in the face of the vertical section, spaced apart side frame members connected to said vertical section; a lightweight, sheet metal extension member having its one end hingedly connected to said nose plate in said recessed area, and formed with transversely spaced ribs of progressively reduced depth, said member adapted when in load carrying position, to overlie and bear on said nose plate, and in raised position to lie substantially flush with the front face of the vertical section of said nose plate.

4. A wheeled dolly comprising a generally L-shaped nose plate having substantially vertically and horizontally disposed sections; spaced apart side frame members connected to said vertical section; a recessed area in said vertical section between said side frame members; and an elongated extension member having raised ribs extending longitudinally thereof and hingedly connected to the nose plate within said recessed area, said extension being swingable to a load carrying position overlying and bearing on the horizontal section of the nose plate, said extension also being swingable to a raised position in which said raised ribs nest within said recessed area to enable said extension to be positioned substantially flush with the vertical section of said nose plate.

References Cited in the file of this patent

UNITED STATES PATENTS

| 394,443 | Berger | Dec. 11, 1888 |
| 497,444 | Duffie | May 16, 1893 |
| 948,964 | Buckley | Feb. 8, 1910 |
| 2,680,027 | De Puydt | June 1, 1954 |
| 2,921,798 | Cislak | Jan. 19, 1960 |

FOREIGN PATENTS

| 936,294 | France | Feb. 16, 1948 |
| 998,054 | France | Sept. 19, 1951 |